(12) United States Patent
McCormick et al.

(10) Patent No.: US 9,294,530 B2
(45) Date of Patent: Mar. 22, 2016

(54) PRODUCING EQUIVALENT CONTENT ACROSS ENCAPSULATORS IN A NETWORK ENVIRONMENT

(71) Applicant: CISCO TECHNOLOGY, INC., San Jose, CA (US)

(72) Inventors: Anne K. McCormick, Boxborough, MA (US); Carol Etta Iturralde, Framingham, MA (US); Eric Colin Friedrich, Somerville, MA (US); Mark D. McBride, Cary, NC (US); Matthew Francis Caulfield, Clinton, MA (US); Scott C. Labrozzi, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 24 days.

(21) Appl. No.: 13/902,335

(22) Filed: May 24, 2013

(65) Prior Publication Data

US 2014/0351455 A1 Nov. 27, 2014

(51) Int. Cl.
*H04L 29/06* (2006.01)
*H04N 21/83* (2011.01)

(52) U.S. Cl.
CPC ............ *H04L 65/601* (2013.01); *H04L 65/607* (2013.01); *H04N 21/83* (2013.01)

(58) Field of Classification Search
CPC ............... H04L 29/0854; H04L 29/08072; H04L 29/06; H04L 29/0809; G06F 1/14
See application file for complete search history.

(56) References Cited

U.S. PATENT DOCUMENTS

| | | | |
|---|---|---|---|
| 2008/0273504 A1* | 11/2008 | Foley | 370/337 |
| 2010/0218033 A1* | 8/2010 | Safari et al. | 714/4 |
| 2011/0050990 A1* | 3/2011 | Farkash | 348/425.4 |
| 2011/0235703 A1 | 9/2011 | Labrozzi et al. | |
| 2012/0128061 A1 | 5/2012 | Labrozzi et al. | |
| 2014/0140417 A1 | 5/2014 | Shaffer et al. | |

OTHER PUBLICATIONS

Dr. Gorry Fairhurst, "MPEG-2 Transmission," © 2001, 7 pages; http://www.erg.abdn.ac.uk/future-net/digital-video/mpeg2-trans.html.
Wikipedia, the free encyclopedia, "MPEG transport stream," Wikipedia®, Feb. 26, 2013, 7 pages; http://en.wikipedia.org/wiki/MPEG_transport_stream.

(Continued)

*Primary Examiner* — Vivek Srivastava
*Assistant Examiner* — Hien Doan
(74) *Attorney, Agent, or Firm* — Patent Capital Group

(57) ABSTRACT

A method is provided in one example and includes receiving first synchronization information associated with a first encapsulated output, receiving second synchronization information associated with a second encapsulated output, and determining whether the first encapsulated output and the second encapsulated output are in synchronization based upon the first synchronization information and the second synchronization information. The method may further include, when the first encapsulated output and the second encapsulated output are determined to out of synchronization, generating corrected synchronization information, and sending the corrected synchronization information to an encapsulator generating at least one of the first encapsulated output and the second encapsulated output.

11 Claims, 6 Drawing Sheets

(56) References Cited

OTHER PUBLICATIONS

Cable Television Laboratories, Inc., "OpenCable™ Specifications—Encoder Boundary Point Specification, OC-SP-EBP-I01-130118," © 2012-2013, 31 pages; http://www.cablelabs.com/specifications/OC-SP-EBP-I01-130118.pdf.

Wikipedia, the free encyclopedia, "Presentation time stamp," Wikipedia®, May 27, 2012, 1 page; http://en.wikipedia.org/wiki/Presentation_time_stamp.

\* cited by examiner

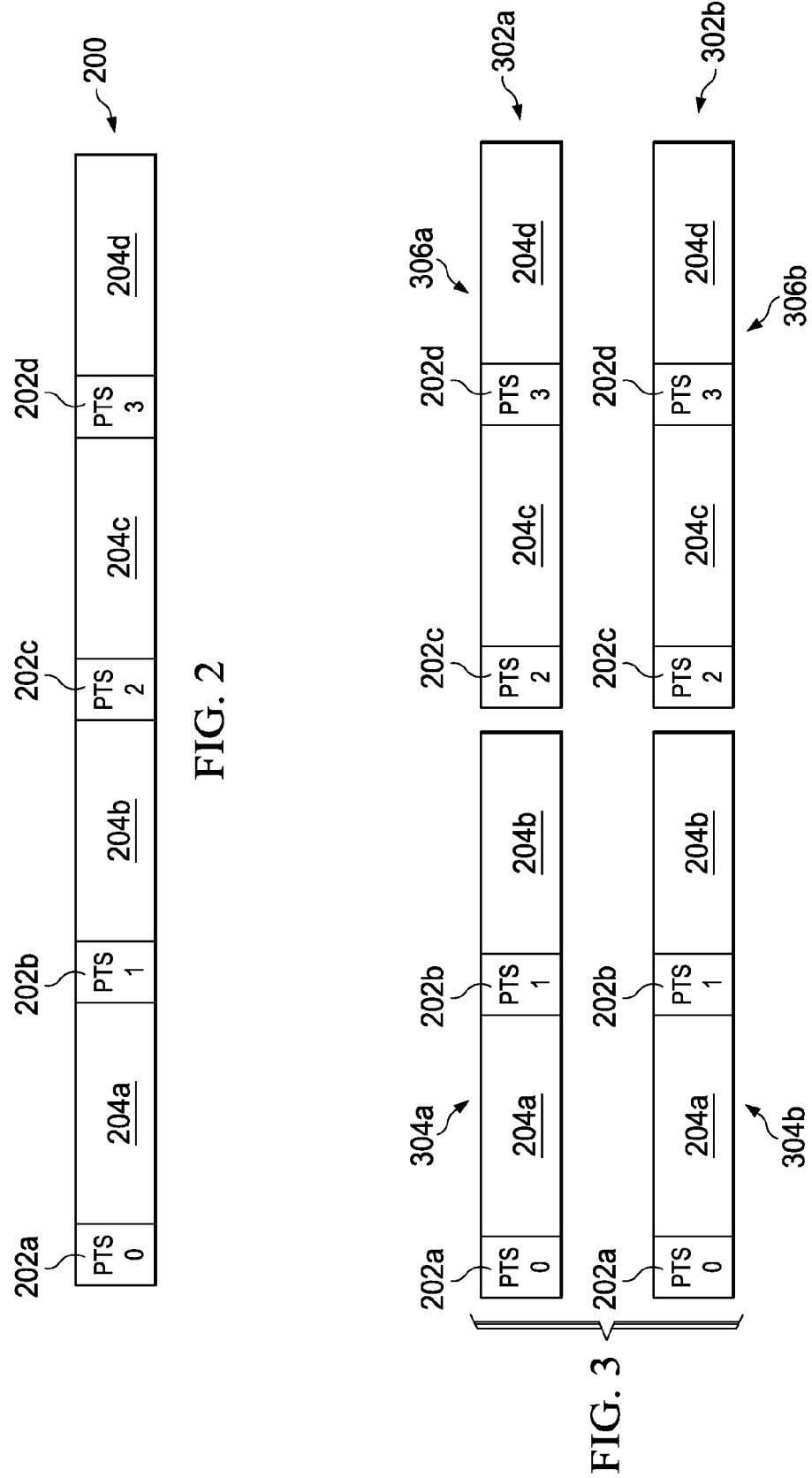

PRODUCING EQUIVALENT CONTENT ACROSS ENCAPSULATORS IN A NETWORK ENVIRONMENT

TECHNICAL FIELD

This disclosure relates in general to the field of communications and, more particularly, to producing equivalent content across encapsulators in a network environment.

BACKGROUND

Adaptive bitrate (ABR) streaming is a technique in which the quality of a media stream is adjusted when the media stream is delivered to a client in order to conform to a desired bitrate. Existing ABR pipelines typically convert a source asset into target specific formats and store the result on an origin server until requested by the client. It may be desirable to employ multiple encapsulators on more than one pipeline for redundancy purposes during the delivery of ABR content to the client. However, current ABR encapsulators are not capable of operating in parallel to produce functionally equivalent redundant copies of live content and associated manifests for a particular encapsulation format. For example, multiple encapsulators may not currently be deployed in parallel such that they generate functionally equivalent copies of Apple HTTP Live Streaming (HLS) segments and associated playlists and/or Microsoft HTTP Smooth Streaming (HSS) fragments and associated manifests.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 illustrates an example embodiment of a media content stream received by each of the first encapsulator and the second encapsulator from the encoder/transcoder of FIG. 1;

FIG. 3 illustrates an embodiment of parallel instances of encapsulation of the media content stream into an encapsulation format in which segments are identified by timestamps;

DETAILED DESCRIPTION OF EXAMPLE EMBODIMENTS

Overview

A method is provided in one example and includes receiving first synchronization information associated with a first encapsulated output and receiving second synchronization information associated with a second encapsulated output. The term "synchronization information" can include any data or information associated with any appropriate synchronization characteristic or activity. Such data or information can include a timestamp value of an encapsulated output, a timestamp wrap count value representative of a number of times the timestamp value has wrapped around to an initial timestamp value within a timestamp range, a timestamp delta value representative of an amount of time that a timestamp has jumped backward in time, a timestamp jump count value representative of a number of times of a discontinuous jump forward in time of a timestamp, an index value associated with the encapsulated output, etc. The method can also include determining whether the first encapsulated output and the second encapsulated output are in synchronization based upon the first synchronization information and the second synchronization information. Note that being "in synchronization" can also encompass any degree of synchronization, as such terminology does not have to be absolute.

In more particular embodiments, determining whether the first encapsulated output and the second encapsulated output are in synchronization further includes determining whether the first synchronization information is equivalent to the second synchronization information. In more particular embodiments, the method further includes, when the first encapsulated output and the second encapsulated output are determined to be out of synchronization, generating corrected synchronization information, and sending the corrected synchronization information to an encapsulator generating at least one of the first encapsulated output and the second encapsulated output. In more particular embodiments, the corrected synchronization information includes one of the first synchronization information and the second synchronization information.

Example Embodiments

Figure 1:
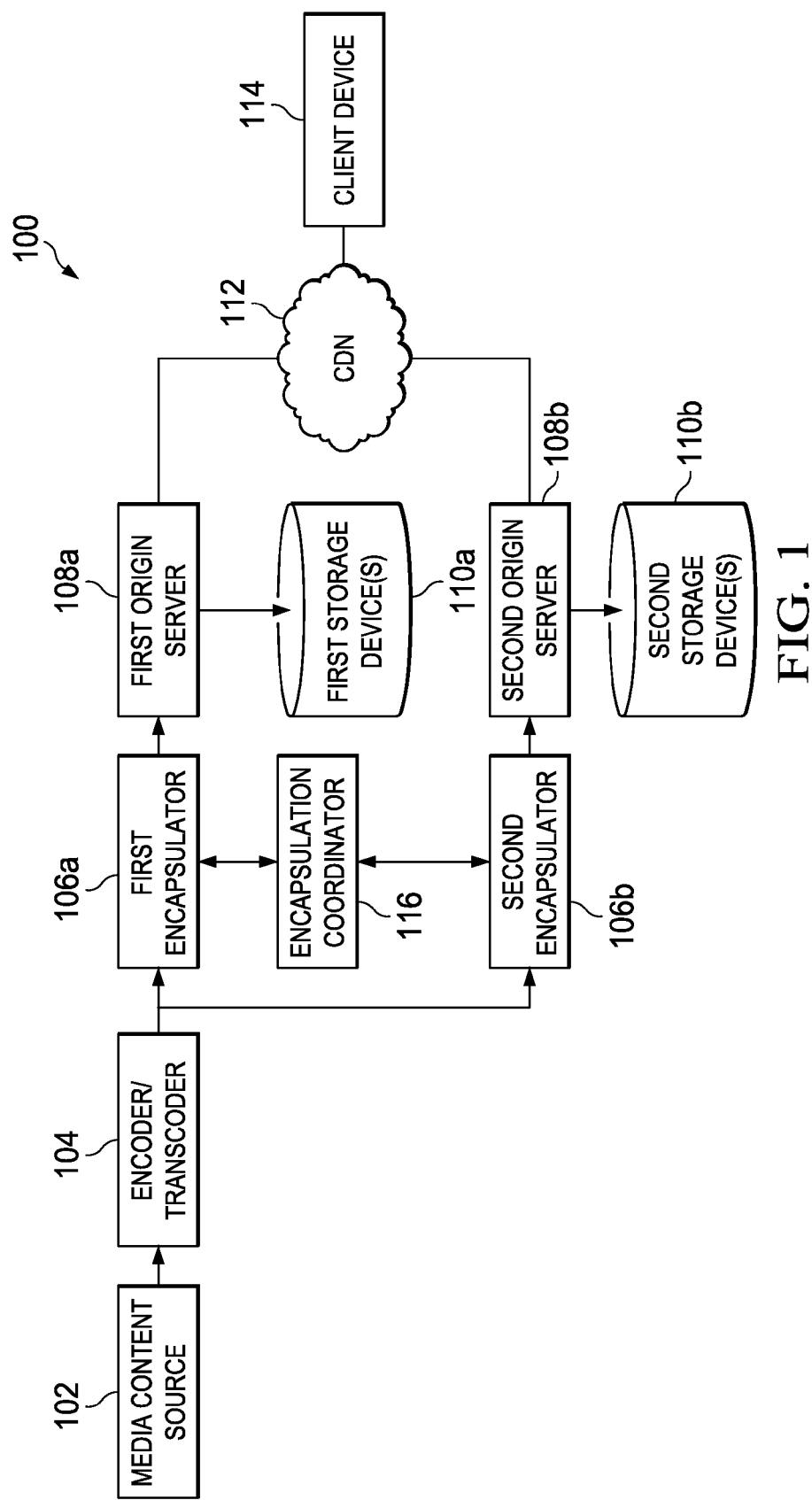
FIG. 1 is a simplified block diagram of a communication system for producing equivalent content across encapsulators in a network environment in accordance with one embodiment of the present disclosure.

Referring now to FIG. 1, FIG. 1 is a simplified block diagram of a communication system 100 for producing equivalent content across encapsulators in a network environment in accordance with one embodiment of the present disclosure. FIG. 1 includes a media content source 102, an encoder/transcoder 104, a first encapsulator 106a, a second encapsulator 106b, a first origin server 108a, a second origin server 108b, first storage device(s) 110a, second storage device(s) 110b, a content distribution network (CDN) 112, a client device 114, and an encapsulation coordinator 116. In the particular illustrated embodiment, media content source 102 is in communication with encoder/transcoder 104, and encoder/transcoder 104 is in further communication with each of first encapsulator 106a and second encapsulator 106b. First encapsulator 106a is in further communication with first origin server 108a, and first origin server 108a is in further communication with first storage device(s) 110a. First origin server 108a is further in communication with client device 114 via CDN 112. In a particular embodiment, CDN 112 is a network of intermediate nodes that function to cache content in a hierarchy of locations to decrease the load on first origin server 108a and second origin server 108b, and to improve the quality of experience for the users using client device 114 to receive media content. Client device 114 may include one or more of a set-top box, a television, a desktop computer, a laptop computer, a tablet, a smartphone a mobile computing device, or any other suitable client device. In a particular embodiment, first encapsulator 106a, origin server 108a, and first storage device(s) 110a form a first pipeline for the delivery of streamed media content to client device 114.

Second encapsulator 106b is in further communication with second origin server 110b, and second origin server 108b, and second origin server 110b is in further communication with second storage device(s) 110b. First storage device(s) 110a and second storage device(s) 110b may include one or more of local storage, network storage, and/or any other suitable storage device. Second origin server 108b is in further communication with client device 114 via CDN 112. In a particular embodiment, second encapsulator 106b, second origin server 108b, and second storage device(s) 110b form a second pipeline for the delivery of streamed media content to client device 114. Encapsulation coordinator 116 is in communication with first encapsulator 106a and second encapsulator 106b.

The first pipeline and second pipeline provide for parallel encapsulation of the same media content source. In various embodiments, parallel encapsulation may provide enormous benefits for service providers by dramatically improving the resiliency and robustness of the encapsulation component of the video delivery pipeline. Parallel encapsulation may enable the real-time population of downstream origin servers with equivalent live adaptive ABR content, and the ability to position simple load-balancing technology downstream of these origin servers to make this redundant content available to downstream CDN caches and a wide variety of ABR end clients, either as live content or even previously recorded content such as Video on Demand (VoD) content. Parallel encapsulation may also enable the real-time ingest of redundant copies of ABR-encoded content from upstream encoders, thereby extending the reach of parallel video delivery pipelines from their current limited scope from encoders only through encapsulators to origin servers and ultimately end clients.

It should be understood that in other embodiments, communication system 100 may include different elements than those illustrated in FIG. 1. In some embodiments, multiple encoders/transcoders may be used instead of the single encoder/transcoder 104 illustrated in FIG. 1. For example, a particular embodiment may include a first encoder/transcoder providing output to first encapsulator 106a and a second/transcoder providing output to second encapsulator 106b in which the first encoder/transcoder and second encoder/transcoder produce equivalent output. In still another embodiment, first storage device(s) 110a and second storage device(s) 110b may be integrated into a single storage component. In other embodiments, first origin server 108a and second origin server 108b may be integrated into a single origin server in which dual copies of content may be received from first encapsulator 106a and second encapsulator 106b and either maintained as separate copies or reduced to a single copy by selecting the best copy. In still other embodiments, communication system 100 may further include a load-balancer downstream of first origin server 108a and second origin server 108b to direct requests from client device 114 to either the first origin server 108a or second origin server 108b based on load-balancing criteria to provide one or more benefits such as reducing load, or providing resiliency when one copy of the content is unavailable at a particular origin server due to the particular origin server being down.

Several challenges and obstacles are overcome in order to produce redundant copies of encapsulated content and manifests, in real time, for each encapsulation format. Real-time content should be segmented (such as divided into Apple™ HTTP Live Streaming (HLS) segments, Microsoft™ HTTP Smooth Streaming (HSS) fragments, etc.) on identical boundary points across copies of the content. In addition segments should be identified using identical names (e.g., indexes, timestamps, uniform resource identifiers (URIs), and encrypted using the same DRM/encryption information (e.g., encryption keys, initialization vectors (IVs)). In addition, associated manifests should be equivalent (e.g., identical) such that either copy could be provided to downstream ABR clients (either end clients or intermediate caches) and the associated content (segments, fragments, etc.) may be retrieved in an alternating fashion from either source (e.g., from either of two redundant origin servers such as first origin server 108a and second origin server 108b).

Various embodiments allow two or more instances of encapsulation to operate in parallel, on the same or different encapsulators, to maintain synchronization and produce equivalent content for different encapsulation formats, recover from imperfect input from upstream encoders (e.g., packet loss, timing discontinuities), encryption key rotation events, and/or recovery from the complete failure upstream (e.g., an encoder, or intermediate network), downstream (e.g., origin server or intermediate network), or of an encapsulator itself.

Referring again to FIG. 1, media content source 102 is configured to provide source media content to encoder/transcoder 104. In one or more embodiments, the source media content may include video, audio, and/or associated metadata. In at least one embodiment, the source media content is provided to encoder/transcoder 104 in a raw format. In still other embodiments, the source media content may first be encoded such that the raw format media content is converted into a compressed format before being provided to encoder/transcoder 104. In still other embodiments, encoding of raw format media content may be performed by encoder/transcoder 104.

Encoder/transcoder 104 is configured to encode and/or transcode the source media content into one or more transcoded versions of the media content having bitrate, quality or other parameters that differ from that of the original media content. For example, in particular embodiments, encoder/transcoder 104 transcodes the source media into one or more lower quality versions of the original source media content in order for the source media content to be more suitable for streaming. In a particular embodiment, encoder/transcoder 104 is configured to transcode the media content to an H.264 format. Encoder/transcoder 104 is further configured to pass the transcoded source media content to first encapsulator 106a and second encapsulator 106b.

First encapsulator 106a and second encapsulator 106b are each configured to encapsulate the transcoded source media content into one or more encapsulation formats such that it is packaged in a correct format for consumption by client device 114. In particular embodiment, the transcoded source media content is encapsulated into an HLS, HSS, Adobe HTTP Dynamic Streaming (HDS), and/or Dynamic Adaptive Streaming over HTTP (DASH) encapsulation format. For example, first encapsulator 106a and/or second encapsulator 106b may each breakup the transcoded source media content into one or more segments or fragments of video and/or audio data. In other examples, first encapsulator 106a and/or second encapsulator 106b may each generate an index, such as a playlist or manifest, associated with the segments or fragments. The index may include reference information identifying locations of the media content within the segments or fragments and is used during playback of the source media content by client device 114.

Encapsulation coordinator 116 functions to enable first encapsulator 106a and second encapsulator 106b to synchronize decisions made during encapsulation of the source media content in order ensure that each of first encapsulator 106a and second encapsulator 106b running in parallel produce equivalent encapsulated output. In various embodiments, encapsulation coordinator 116 receives synchronization information from each of first encapsulator 106a and second encapsulator 106b, determines whether the encapsulation output produced by first encapsulator 106a and second encapsulator 106b are in synchronization within an acceptable threshold, and instructs one or more of first encapsulator 106a and second encapsulator 106b to take corrective action to synchronize the encapsulation outputs if they are not in synchronization as will be further described herein.

First encapsulator 106a sends the encapsulated source media content generated by first encapsulator 106a to first origin server 108a, and first origin server 108a stores the encapsulated media content within first storage device(s) 110a. Second encapsulator 106b sends the encapsulated source media content generated by second encapsulator 106b to second origin server 108b, and second origin server 108b stores the encapsulated media content within second storage device(s) 110b.

At a later time, client device 116 requests the source media content via CDN 112 and CDN 112 relays the request to either first origin server 108a or second origin server 108b. First origin server 108a or second origin server 108b may retrieves the encapsulated source media content from either first storage device(s) 110a or second storage device(s) 110b and sends the encapsulated source media content to client device 114.

Various embodiments take advantage of the ability of encoder/transcoder 104 to produce output to first encapsulator 106a and second encapsulator 106b that is segmentable (i.e. has key frames, instantaneous decoder refresh frames (IDRs)) at precisely the same points across different profiles (such as for different quality levels) of a given copy of the content, but also across parallel redundant encodings of the same content. The segments or fragments are marked by segmentation boundary markers, such as key frames or instantaneous decoder refresh frames (IDRs). These segmentation boundary point markers are referred to herein as Encoder Boundary Points (EBPs).

Various embodiments do not require that upstream encoder/transcoder 104 explicitly identifies or marks the segmentation boundaries. However, in some embodiments, encoder/transcoder 104 may include explicit markings to improve overall performance by reducing the guesswork and hence reducing the likelihood of occasional errors which may occur if first encapsulator 106a or second encapsulator 106b select the wrong segmentation boundary points (e.g., selecting different key frames during periods where multiple such frames occur close together in time). Although various embodiments provide for self-correction of such errors regardless of whether encoder/transcoder 104 includes explicit EBPs, the inclusion of explicit EBPs by encoder/transcoder 104 may increase reliability.

Encapsulation coordinator 116 functions as a coordinating entity that enables parallel encapsulating instances running on either the same or different physical encapsulator devices to synchronize encapsulation decisions in order to produce equivalent encapsulated output. Encapsulation decisions performed by first encapsulator 106a and/or second encapsulator 106b during encapsulation operations may include segmentation boundary point selection, identifiers for the resulting segments, key rotation boundaries, or any other encapsulation decisions. In particular embodiments, encapsulation coordinator 116 may reside on the same physical device as one of the encapsulating instances such as first encapsulator 106a or second encapsulator 106b. In still other embodiments encapsulation coordinator 116 may reside on a separate physical device.

Decision Points and Synchronization Information

During parallel redundant encapsulation of media content such as live content, there are discrete points, for example, segmentation boundaries where decisions are made by first encapsulator 106a and second encapsulator 106b which may include for example segmenting the content, assigning a segment name to the content, performing segment encryption, and/or rotating an encapsulation key for a segment which, if not coordinated across redundant encapsulations, may result in encapsulated content that is not functionally equivalent. These discrete points are reference to as decision points herein. These decision points may differ for different encapsulation formats, as they typically correlate with the encapsulation of a segment or fragment which need not be aligned across format types. For example, HLS Segments may be created every ten seconds, whereas HSS fragments may be created every two seconds.

In accordance with various embodiments, first encapsulator 106a and second encapsulator 106b are configured to: implement common algorithms such that the same decisions are made when possible in parallel by first encapsulator 106a and second encapsulator 106b at these decision points without any need for coordination, report decisions (or would-be decisions, if known ahead of time) to the encapsulation coordinator 116 either proactively or on-demand, and accept instruction from the encapsulation coordinator 116 to enforce a decision in order to ensure aligned decisions or correct misaligned decisions across the parallel encapsulations of first encapsulator 106a and second encapsulator 106b. Encapsulating entities that implement these processes are coordinated by encapsulation coordinator 116 to produce equivalent output, and can be re-synchronized by encapsulation coordinator 116 in the event they become out of synchronization.

The set of decisions made (or about to be made) by an encapsulating entity at these decision points are referred to as synchronization information (SyncInfo). In at least one embodiment, the SyncInfo further includes an identifier for the encoder boundary point at which the decisions are taken. In a particular embodiment, the identifier is the earliest Presentation Timestamp (ePTS) of the segment or fragment (e.g., HLS Segment, Microsoft Smooth Fragment, Dynamic Adaptive Streaming over HTTP (DASH) Segment, etc.).

In various embodiments, encapsulation coordinator 116 may periodically poll each of first encapsulator 106a and second encapsulator 106b for their latest encapsulation synchronization information, receive synchronization information from each of first encapsulator 106a and second encapsulator 106b, and store a predetermined amount of the synchronization information in a history. Encapsulation coordinator 116 may then compare the synchronization information associated with each redundant encapsulating instance generated by first encapsulator 106a and second encapsulator 106b to determine whether the encapsulating instances are either the same or offset (i.e. equivalent) from one another within a predetermined window and thus synchronized. If encapsulation coordinator 116 determines that the encapsulating instance of first encapsulator 106a and second encapsulator 106b are not synchronized, encapsulation coordinator 116 may generate corrected synchronization information and send the corrected synchronization information to one or more of first encapsulator 106a and second encapsulator 106b. Upon receiving the corrected synchronization information, first encapsulator 106a or second encapsulator 106b may use the corrected synchronization information to begin encapsulating content such that it is in synchronization with the encapsulator that is determined to be correct. In at least one embodiment, the corrected synchronization information includes the synchronization information associated with the correctly functioning encapsulator as a starting decision point for generating segments and/or fragments.

Synchronization of Names (Timestamps or Indexes)

Redundant encapsulating entities should produce identical names or identifiers for equivalent content segments. Different encapsulation technologies (such as Microsoft's Smooth Streaming, Apple's HTTP Live Streaming, MPEG DASH, etc.) use different techniques for identification of content segments. In some cases, timestamps are used as identifiers (e.g., Smooth Fragment Timestamp). In other cases, monotonically increasing numbers are used (e.g., HLS Indexes). In the case of DASH, both methods are supported.

Timestamps

When synchronized encapsulations are produced in parallel, corresponding segments with equivalent content are assigned identical names (e.g., timestamps). This is achieved by leveraging the assumption that the content is equivalent and the fact that it contains embedded timestamps such as Presentation Timestamps. Assuming that the parallel encapsulating entities correctly locate the same encoder segmentation boundaries in the incoming content, each fragment or segment (Smooth Fragment, HLS Segment, DASH Segment etc.) of content will contain identical timestamps. For example, in a particular embodiment the earliest Presentation Timestamp (ePTS) will be the same for each fragment or segment. The first PTS of each segment of content is referred to as the ePTS, and the ePTS may be used to derive identical timestamps (e.g., Smooth Timestamp) for the resulting Segment.

There are a few issues to be overcome when using PTS to derive such timestamps. In some instances, the PTS may not be used directly as the timestamp, as it may be much less granular than needed by using fewer bits to represent the timestamp. While some timestamps, such as a Microsoft Smooth Timestamp, do not wrap for many years, other timestamps such as a PTS wrap in approximately 26.5 hours. Timestamp wrapping refers to when a timestamp reaches its maximum value within a timestamp range and starts again at a zero or other starting value. In various embodiments, this is overcome by maintaining a counter of the number of times the incoming PTS has wrapped. The current value of the number of times the PTS value has wrapped is referred to herein as the pts_wrap_count value. Given the incoming ePTS and the pts_wrap_count value, a timestamp with sufficient granularity is constructed and is used as the timestamp of the encapsulated (e.g., Microsoft Smooth or DASH) segments.

Another issue that may arise when using PTS to derive timestamps is that PTS timelines of the incoming stream may change, which effectively appears as a reset of the incoming PTS to a random value to an encapsulation entity. This may present a problem, as segment identifiers should not go backwards in time. Otherwise, the same identifiers might be used for different segments. This challenge is overcome in various embodiments by maintaining a compensation value referred to as pts_delta which may be used to compensate for a backward jump in timestamps. For example, if the incoming PTS suddenly jumps backward by n units, the pts_delta is increased by n. The resulting timestamp is then generated as a function of the incoming ePTS by applying the pts_wrap_count value, and then adding back the pts_delta value, effectively erasing the backward jump. In the case of a PTS jump in the forward direction, the same technique may be used to effectively erase the jump, or alternately, it may be left alone allowing the timestamp to similarly jump forward. The latter may be desirable as a means of propagating the timeline shift downstream, and may not violate the requirements of a particular encapsulation format. In particular embodiments, a pts_jump_count value may also be maintained to indicate the number of times such timeline discontinuities have been noticed and accounted for by the encapsulating entity.

Still another issue that may occur when generating identical timestamps for equivalent content is that if there is input loss upstream of one or more encapsulating entities. If both encapsulating entities, for example first encapsulator 106a and second encapsulator 106b, experience identical input loss, they will remain synchronized with respect to derivation of identical timestamps for equivalent content. If only one encapsulating entity experiences loss and this loss happens to include the segmentation boundary marker and ePTS from which the timestamp would be derived, this encapsulating entity may experience what appears to be a PTS jump forward while a redundant encapsulating entity may not. This may result in the encapsulating entities becoming out of synchronization with respect to one another by producing different timestamps for the same content.

FIG. 2 illustrates an example embodiment of a media content stream 200 received by each of first encapsulator 106a and second encapsulator 106b from encoder/transcoder 104 of FIG. 1. In particular embodiments, media content stream 200 is an MPEG-2 Transport Stream (MPEG2-TS) stream. Media content stream includes a packet stream having a first presentation timestamp (PTS 0) 202a, a first media content portion 204a, a second presentation timestamp (PTS 1) 202b, a second media content portion 204b, a third presentation timestamp (PTS 2) 202c, a third media portion 204c, a fourth presentation timestamp (PTS 3), and a fourth media content portion 204d. First presentation timestamp 202a, second presentation timestamp 202b, third presentation timestamp 202c, and fourth presentation timestamp 202d are timestamps, which may be used by client device 114 to present portions of the media content in a synchronized manner and in a proper playback order. In a particular embodiment, first presentation timestamp 202a, second presentation timestamp 202b, third presentation timestamp 202c, and fourth presentation timestamp 202d are included in respective header portions of media content stream 200. Each of first media content portion 204a, second media content portion 204b, third media portion 204c, and fourth media content portion 204d may include video data, audio data or metadata related to a portion of the source media content.

FIG. 3 illustrates an embodiment of parallel instances of encapsulation of media content stream 200 of FIG. 2 into an encapsulation format in which segments are identified by timestamps. A first encapsulation instance 302a generated by first encapsulator 106a from media content stream 200 includes a first segment 304a and a second segment 306a. First segment 304a includes first presentation timestamp (PTS 0) 202a, first media content portion 204a, second presentation timestamp (PTS 1) 202b, and second media content portion 204b. In the embodiment illustrated in FIG. 3, first encapsulator 106a has determined that first presentation timestamp (PTS 0) 202a is a decision point for segmentation of first segment 304a because it is the ePTS being the first PTS of first segment 304a. In at least one embodiment, first encapsulator 106a further maintains a count of the number of times the PTS value has wrapped around back to a zero value (pts_wrap_count) and a value representative of a number of units (if any) in which the incoming PTS value has jumped backward in timestamp value (pts_delta). In accordance with one or more embodiments, first encapsulator 106a may further maintain a PTS jump count (pts_jump_count) to indicate the number of times a timeline discontinuity has occurred. In at least one embodiment, first encapsulator 106a sends synchronization information associated with first segment 304a to encapsulation coordinator 116, which may include one or more of the ePTS (first presentation timestamp 202a), pts_wrap_count value, pts_delta value, and pts_jump_count value of first segment 304a. In still other embodiments, instead of sending the ePTS value to encapsulation coordinator 116, first encapsulator 106a may send any other timestamp, identifier, or name suitable for identifying first segment 304a. Second segment 306a further includes third presentation timestamp (PTS 2) 202c, third media content portion 204c, fourth presentation timestamp (PTS 3) 202d, and fourth media content portion 204d. In the embodiment illustrated in FIG. 3, first encapsulator 106a has determined that third presentation timestamp 202c is a decision point for segmentation of second segment 306a. In at least one embodiment, first encapsulator 106a sends synchronization information associated with second segment 306a to encapsulation coordinator 116, which may include one or more of the ePTS (third presentation timestamp 202c), pts_wrap_count value, pts_delta value, and pts_jump_count value of second segment 306a.

A second encapsulation 302b instance generated by second encapsulator 106b from media content stream 200 includes a third segment 304b and a fourth segment 306b. Third segment 304b includes first presentation timestamp 202a, first media content portion 204a, second presentation timestamp (PTS 1) 202b, and second media content portion 204b. In the embodiment illustrated in FIG. 3, second encapsulator 106b has determined that first presentation timestamp (PTS 0) 202a is a decision point for segmentation of third segment 304b because it is the ePTS being the first PTS of third segment 304b. In at least one embodiment, second encapsulator 106b further maintains a count of the number of times the PTS value has wrapped around back to a zero value (pts_wrap_count) and a value representative of a number of units, if any, in which the incoming PTS value has jumped backward in timestamp value (pts_delta). In accordance with one or more embodiments, second encapsulator 106b may further maintain a PTS jump count (pts_jump_count) to indicate the number of times a timeline discontinuity has occurred. In at least one embodiment, second encapsulator 106b sends synchronization information associated with third segment 304b to encapsulation coordinator 116, which may include one or more of the ePTS, pts_wrap_count value, pts_delta value, and pts_jump_count value of third segment 304b. Fourth segment 306a further includes third presentation timestamp 202c, third media content portion 204c, fourth presentation timestamp 202d, and fourth media content portion 204d. In the embodiment illustrated in FIG. 3, second encapsulator 106a has determined that third presentation timestamp 202c is a decision point for segmentation of fourth segment 306n. In at least one embodiment, second encapsulator 106b sends synchronization information associated with fourth segment 306a to encapsulation coordinator 116, which may include one or more of the ePTS, pts_wrap_count value, pts_delta value, and pts_jump_count value of second segment 306a. As shown in FIG. 3, first encapsulator 106a and second encapsulator 106b generate equivalent encapsulation instances, first encapsulation instance 302a and second encapsulation instance 302b, respectively, from the same media content stream 200. In some instances the encapsulation instances may be slightly shifted in time with respect to one another, while still maintaining equivalency.

Referring again to FIG. 1, in accordance with various embodiments encapsulation coordinator 116 detects and corrects the synchronization errors of first encapsulator 106a and second encapsulator 106b from the synchronization information received from each of first encapsulator 106a and second encapsulator 106b. In at least one embodiment, first encapsulator 106a and second encapsulator 106b each report synchronization information, which includes their respective pts_wrap_count, pts_delta, and pts_jump_count to encapsulation coordinator 116 periodically. In particular embodiments, first encapsulator 106a and second encapsulator 106b may report synchronization information as frequently as each decision point occurs, e.g., as each Smooth Fragment or HLS Segment is produced such as every two to ten seconds. Encapsulation coordinator 116 verifies that at the decision points (e.g., identified by ePTS value in a fragment), the same naming decisions have been made. For example, in a particular embodiment encapsulation coordinator 116 verifies that the same pts_wrap_count and pts_delta are applied to the ePTS value to generate the same timestamp. If encapsulation coordinator 116 detects that differing decisions are made, the encapsulation coordinator 116 takes action to correct one of first encapsulator 106a and second encapsulator 106b by sending the correct synchronization information, for example the correct ePTS, pts_wrap_count, and pts_delta, to one of first encapsulator 106a and second encapsulator 106b.

In at least one embodiment, first encapsulator 106a and second encapsulator 106b remain synchronized by producing the same timestamps or names for equivalent fragments or segments by using common algorithms for deriving these timestamps or names. In a particular embodiment in which Microsoft Smooth timestamps are used, first encapsulator 106a and second encapsulator 106b maintain and use the pts_wrap_count value and the pts_delta value to similarly derive Smooth Timestamps. First encapsulator 106a and second encapsulator 106b report the synchronization information, such at the pts_wrap_count value and the pts_delta value, and timestamp/name to encapsulation coordinator 116 periodically, and accept instructions from encapsulation coordinator 116 to use different synchronization information in cases in which synchronization has been lost between first encapsulator 106a and second encapsulator 106b.

In various embodiments, encapsulation coordinator 116 uses synchronization information not only to detect out-of-synch redundant encapsulations and to correct them, but also may use the synchronization information to ensure that redundant encapsulations are started off in a synchronized state at initial creation. In at least one embodiment, when one instance of a redundant encapsulation is started by an encapsulation entity, the synchronization information is collected from this encapsulating entity by encapsulation coordinator 116, and encapsulation coordinator 116 communicates this synchronization to the encapsulating entity of the other redundant instance. For example, first encapsulator 106a may begin encapsulating media content and report the synchronization information associated with the encapsulation to encapsulation coordinator 116. Encapsulation coordinator 116 may then communicate this synchronization information to second encapsulator 106b. Second encapsulator 106b may then used this received synchronization information to begin encapsulating the same content such that the two instances of encapsulation remain synchronized. In various embodiments, this procedure may be repeated if an encapsulating instance fails and is then is subsequently re-created.

Indexes

Creating and maintaining redundant encapsulations when segments are identified by an index has many similarities with the situation in which a segment or fragment is identified by a timestamp identifier as described above. However, identifying segments or fragments by an index necessitates some differences in implementation. In an embodiment in which first encapsulator 106a and second encapsulator 106b identify segments or fragments by an index, encapsulation coordinator 116 creates a first instance of encapsulation without providing any synchronization information. For example, in a first encapsulating instance first encapsulator 106a may begin locating a segmentation boundary identified by an ePTS within the encoded/transcoded media content and selecting a starting index (for example, a starting index=1) independently without coordinating with other encapsulating instances as there are no other encapsulating instances currently available. First encapsulator 106a sends synchronization information regarding the first encapsulating instance to encapsulation coordinator 116. Encapsulation coordinator 116 then sends the synchronization information regarding the first encapsulating instance generated by first encapsulator 106a to second encapsulator 106b. In a particular embodiment, the synchronization information includes the earliest presentation timestamp (ePTS) and index value associated with the first encapsulating instance. Second encapsulator 106b then creates a second instance of encapsulation with knowledge of the recent synchronization information (e.g., ePTS, Index) from the first instance. The synchronization information enables the second instance to start in synchronization with the first instance by using the same index value to identify the same segment. For example, if the first instance used an ePTS of n with Index=1, and the second instance found its first segmentation boundary at an ePTS of n plus twenty seconds which is two HLS Segments in the future, second encapsulator 106b will use an Index value of 1+2=3. First encapsulator 106a generating first encapsulating instance and second encapsulator 106b reporting the second encapsulating instance both periodically report their synchronization information to encapsulation coordinator 116. In one or more embodiments, the synchronization information is reported to encapsulation coordinator 116 via a "heartbeat" message from each of first encapsulator 106a and second encapsulator 106b, allowing encapsulation coordinator 116 to detect, and correct out-of-sync conditions between the first encapsulating instance and the second encapsulating instance.

Figure 4:
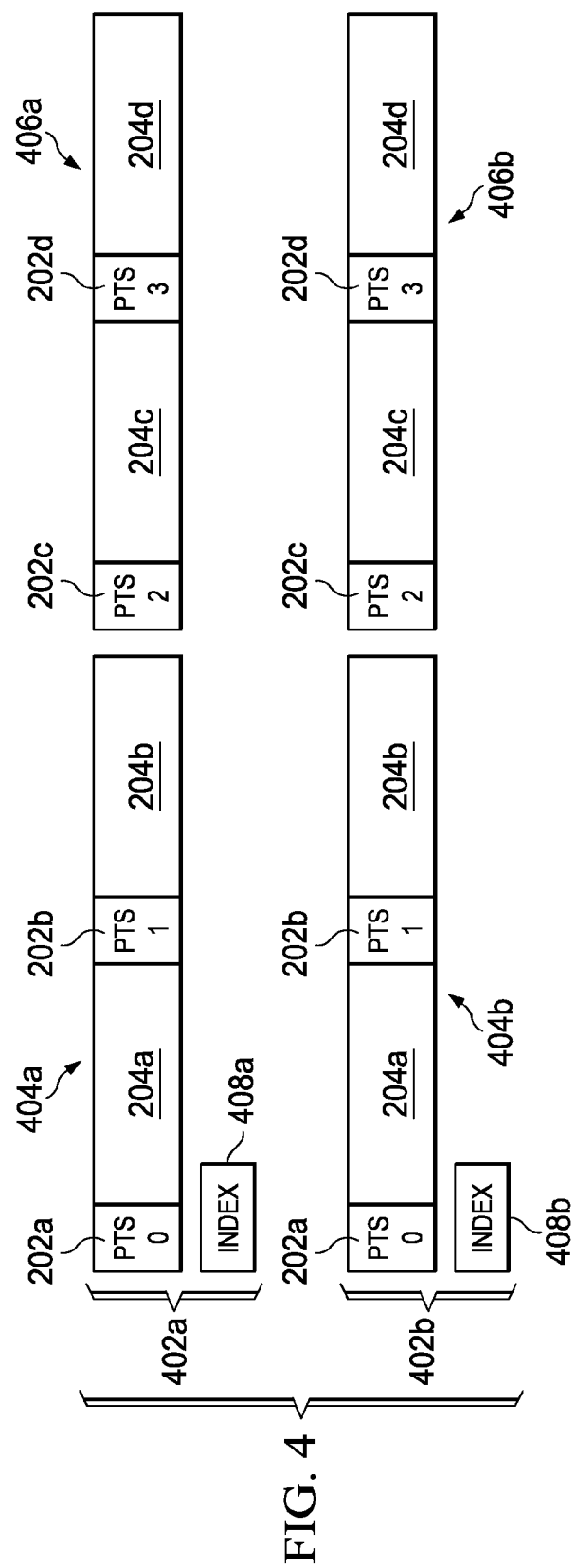
FIG. 4 illustrates an embodiment of parallel instances of encapsulation of the media content stream into an encapsulation format in which segments are identified by indexes.

FIG. 4 illustrates an embodiment of parallel instances of encapsulation of media content stream 200 of FIG. 2 into an encapsulation format in which segments are identified by indexes. A first encapsulation instance 402a generated by first encapsulator 106a from media content stream 200 includes a first segment 404a, a second segment 406a, and a first index 408a. First segment 404a includes first presentation timestamp (PTS 0) 202a, first media content portion 204a, second presentation timestamp (PTS 1) 202b, and second media content portion 204b. In the embodiment illustrated in FIG. 4, first encapsulator 106a has determined that first presentation timestamp 202a is a decision point for segmentation of first segment 404a. First index 408a contains references to the identity and respective locations of first segment 404a and second segment 406a used by client device 114 to retrieve first segment 404a and second segment 406a during playback of the media content. Index file 408a is identified by a particular index value generated by first encapsulator 106a.

In at least one embodiment, first encapsulator 106a sends synchronization information associated with first segment 404a to encapsulation coordinator 116, which may include one or more of the ePTS (first presentation timestamp 202a) of first segment 304a and index value associated with index 408a. In still other embodiments, instead of sending the ePTS value to encapsulation coordinator 116, first encapsulator 106a may send any other timestamp, identifier, or name suitable for identifying first segment 404a. Second segment 406a further includes third presentation timestamp (PTS 2) 202c, third media content portion 204c, fourth presentation timestamp (PTS 3) 202d, and fourth media content portion 204d. In the embodiment illustrated in FIG. 3, first encapsulator 106a has determined that third presentation timestamp 202c is a decision point for segmentation of second segment 406a. In at least one embodiment, first encapsulator 106a sends synchronization information associated with second segment 306a to encapsulation coordinator 116, which may include one, or more of the ePTS (third presentation timestamp 202c) and index value associated with index 408a.

A second encapsulation 402b instance generated by second encapsulator 106b from media content stream 200 includes a third segment 404b, a fourth segment 406b, and a second index 408b. Third segment 404b includes first presentation timestamp 202a, first media content portion 204a, second presentation timestamp (PTS 1) 202b, and second media content portion 204b. In the embodiment illustrated in FIG. 4, second encapsulator 106b has determined that first presentation timestamp 202a is a decision point for segmentation of third segment 404b. Second index 408b contains references to the identity and respective locations of third segment 404a and fourth segment 406b used by client device 114 to retrieve third segment 404b and second segment 406b during playback of the media content. Index file 408b is identified by a particular index value generated by first encapsulator 106a.

In at least one embodiment, first encapsulator 106a sends synchronization information associated with third segment 404b to encapsulation coordinator 116, which may include one or more of the ePTS (first presentation timestamp 202a) of third segment 404a and the index value associated with index 408b. In still other embodiments, instead of sending the ePTS value to encapsulation coordinator 116, second encapsulator 106b may send any other timestamp, identifier, or name suitable for identifying third segment 404b. Fourth segment 406b further includes third presentation timestamp 202c, third media content portion 204c, fourth presentation timestamp 202d, and fourth media content portion 204d. In the embodiment illustrated in FIG. 4, second encapsulator 106b has determined that third presentation timestamp 202c is a decision point for segmentation of fourth segment 406b. In at least one embodiment, second encapsulator 106b sends synchronization information associated with fourth segment 406b to encapsulation coordinator 116, which may include one, or more of the ePTS (third presentation timestamp 202c) and index value associated with index 408b. In various embodiments, first encapsulator 106a and second encapsulator 106b use equivalent algorithms to generate the decision points and index files such that the first encapsulating instance 402a and second encapsulating instance 402b are equivalent. As shown in FIG. 3, first encapsulator 106a and second encapsulator 106b generate equivalent encapsulation instances, first encapsulation instance 402a and second encapsulation instance 402b, respectively, from the same media content stream 200. In some instances the encapsulation instances may be slightly shifted in time with respect to one another, while still maintaining equivalency.

When segments are named via indexes, there is no need for pts_wrap_count nor pts_delta since there is no need to produce a granular timestamp for naming Segments. Instead, indexes should increment monotonically for each segment, and identify or name the same segment across all encapsulating instances. Provided the segmentation boundary intervals are known by both encapsulating instances, each may independently implement the same algorithm to locate the next segmentation boundary and assign the next higher index value as a name for the segment. In the case where additional segmentation is needed, such as to take advantage of advertisement opportunities marked by in-band SCTE35 markers as defined by the Society of Cable and Telecommunications Engineers (SCTE), it is still possible for the independent encapsulating entities to locate the same segmentation boundary points via PTS values in SCTE35 markers and hence creating segments including of the same content and independently assign the same Index values to corresponding segments. This is another example of parallel the encapsulating entities first encapsulator 106a and second encapsulator 106b using identical algorithms to produce synchronized content.

In various embodiments, the ePTS is used to identify decision points as segmentation boundaries chosen to create new segments. When a PTS wraps, the next ePTS is simply smaller than the previous one. However, this has no adverse impact on the naming by index which increments to the next higher value. The index does not go backward in the case of a PTS wrap, and there is no need for a pts_wrap_count to preserve the integrity of segment names.

if the PTS timelines of the incoming stream may change, again there is no adverse impact on the naming by index. Each independent encapsulating entity, first encapsulator 106a and second encapsulator 106b, searches for the most appropriate next segmentation boundary, identifies the ePTS of the next segment, and assigns the next higher Index value to this segment. There is no need for a pts_wrap, pts_delta or pts_jump_count. In one or more embodiments, first encapsulator 106a and second encapsulator 106b searches for the most appropriate next segmentation boundary either using EBP markers or expected time intervals between boundaries and possibly SCTE35 markers.

In the case of input loss upstream of one or both of first encapsulator 106a and second encapsulator 106b, if both encapsulating entities experience identical input loss, they will remain synchronized with respect to derivation of identical Indexes for equivalent content. If only one of first encapsulator 106a and second encapsulator 106b experiences loss, this could result in the encapsulating entities becoming out of synchronization with one another, e.g., producing different indexes for the same content. However, this condition is detected and corrected by encapsulation coordinator 116 due to first encapsulator 106a and second encapsulator 106b reporting their synchronization information (ePTS, Index) to encapsulation coordinator 116 periodically. In a particular embodiment, the synchronization information is reported by each of first encapsulator 106a and second encapsulator 106b includes the ePTS and index value associated with a segment. In still another particular embodiment, first encapsulator 106a and second encapsulator 106b as frequently as each decision point, e.g., as each HLS Segment is produced, such as every ten seconds.

Encapsulation coordinator 116 verifies that at decision points (e.g., identified by ePTS value of a segment) the same naming decisions are made (e.g., same Index value is used to name the segment). If encapsulation coordinator 116 detects that differing decisions are made, encapsulation coordinator 116 takes action to correct one of first encapsulator 106a and second encapsulator 106b by sending the correct synchronization information (e.g., ePTS value, Index) to one or more of first encapsulator 106a and second encapsulator 106b.

In the case of indexes, independent encapsulating entities first encapsulator 106a and second encapsulator 106b remain synchronized in that they produce the same indexes for equivalent Segments by using common algorithms for deriving these indexes such as by monotonically increasing the index value with each new segment produced, by reporting this synchronization to encapsulation coordinator 116 periodically, and by accepting instructions from encapsulation coordinator 116 to use different synchronization information in cases in which synchronization has been lost.

In various embodiments, encapsulation coordinator 116 uses the synchronization information not only to detect out-of-synch redundant encapsulations and to correct them, but also may be used to ensure that redundant encapsulations are initiated (i.e., start off) in a synchronized state. As previously discussed, during startup one instance of a redundant encapsulation is started by first encapsulator 106a, the synchronization information is collected from first encapsulator 106a by encapsulation coordinator 116, and is communicated by encapsulation coordinator 116 to second encapsulator 106b. Second encapsulator 106b uses the synchronization information to begin its encapsulation instance in synchronization with first encapsulator 106a. In various embodiments, this process may be repeated if an encapsulating instance fails and is subsequently re-created.

Synchronization of Digital Rights Management (DRM) Information

Some media content may be protected by digital rights management (DRM) techniques such as through the use of DRM information such as encryption keys and/or key rotation boundaries. In accordance with various embodiments, the procedures described herein may be extended to ensure that redundant encapsulating entities continue to produce equivalent content when the content is encrypted by using the same keys, initialization vectors (IVs) and/or rotating/incrementing these keys/IVs on the same segmentation boundaries. In particular embodiments, encapsulation coordinator 116 is used to create redundant instances, supply the same synchronization information (e.g., synchronizing names) as well as include DRM information or other encryption information for synchronizing encryption between first encapsulator 106a and second encapsulator 106b. In a particular embodiment, encapsulation coordinator 116 provides the particular key or IV to be use when encrypting segments to each of first encapsulator 106a and second encapsulator 106b. In various embodiments, encapsulation coordinator 116 is used to trigger key rotation in a synchronized manner similarly to the action taken by encapsulation coordinator 116 to synchronize out-of-synch encapsulating instances. In a particular embodiment, encapsulation coordinator 116 sends synchronization information to both first encapsulator 106a and second encapsulator 106b indicating the upcoming ePTS at which a key rotation should occur, as well as the new DRM information to be used as of this upcoming segment. In cases in which upcoming key rotation boundaries are signaled in-band (e.g., via SCTE35 markers), first encapsulator 106a and second encapsulator 106b may use the synchronization information reporting mechanism to report the upcoming ePTS of the future segment at which key rotation should occur.

Various embodiments described herein enable encapsulators to operate in parallel to produce redundant copies of media content, such as live content and associated manifests, for a variety of encapsulation formats such as HLS and HSS. Such parallel encapsulation provides enormous benefits to a video acquisition pipeline, improving the resiliency and robustness of the encapsulation component of the pipeline, complementing and extending the benefits of parallel encoding/transcoding capabilities, and enabling downstream origin servers, such as first origin server 108a and second origin server 108b, to provide redundant, equivalent, interchangeable copies of the media content at the origination layer, which in turn may be leveraged by the downstream CDN 112.

One or more embodiments may overcome many challenges introduced by diverse encapsulation protocols (using different naming techniques, segmentation intervals, DRM models, etc.), upstream packet loss, timeline discontinuities, and DRM, using a synchronization mechanism to coordinate encapsulation. The required synchronization information is relatively minimal, and need not be coordinated more frequently than the natural ABR segmentation boundary intervals, e.g., every two seconds or greater, making it a very scalable solution. One or more embodiments may greatly enhance the robustness and resiliency of a live media encapsulation pipeline, not only at the encapsulation component, but for downstream components as well such as origin servers and CDNs.

Figure 5:
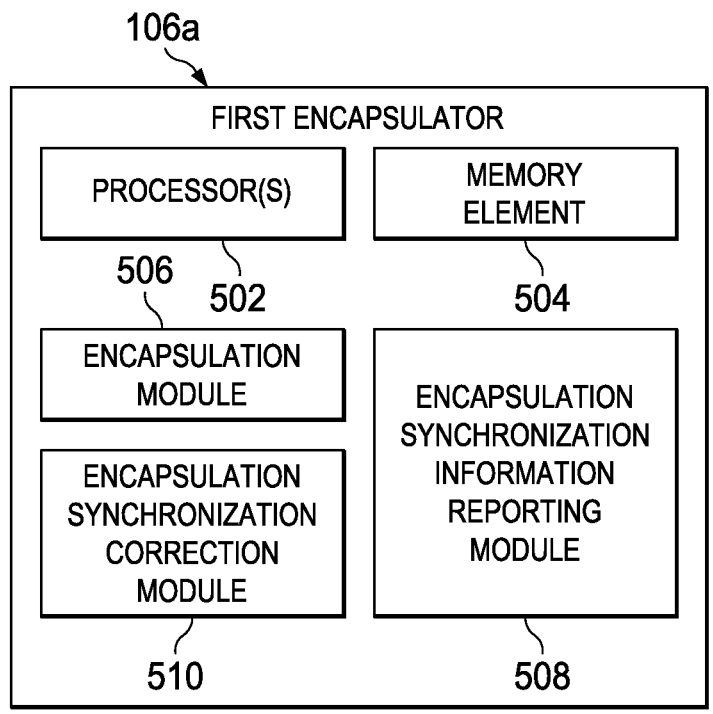
FIG. 5 illustrates a simplified block diagram of an embodiment of the first encapsulator of FIG. 1.

FIG. 5 illustrates a simplified block diagram of an embodiment of first encapsulator 106a of FIG. 1. First encapsulator 106a includes processor(s) 502, memory element 504, encapsulation module 506, encapsulation synchronization information reporting module 508, and encapsulation synchronization correction module 510. Processor(s) 202 is configured to execute various tasks of first encapsulator 106a as described herein and memory element 204 is configured to store data associated with first encapsulator 106a. Encapsulation module 506 is configured to convert the received media content from encoder/transcoder 104 and perform the encapsulation operations as further described herein. Encapsulation synchronization reporting module 508 is configured to report synchronization information associated with an encapsulating instance to encapsulation coordinator 116. Encapsulation synchronization correction module 510 is configured to receive corrected synchronization information from encapsulation coordinator 116 in a case in which encapsulation coordinator 116 determines that two or more encapsulating instances are out of synchronization, and continue an encapsulating instance using the corrected synchronization information. In some embodiments, second encapsulator 106b may be configured in the same or a similar manner as first encapsulator 106a.

In one implementation, first encapsulator 106a is a network element that includes software to achieve (or to foster) the encapsulation operations as outlined herein in this Specification. Note that in one example, each of these elements can have an internal structure (e.g., a processor, a memory element, etc.) to facilitate some of the operations described herein. In other embodiments, these encapsulation operations may be executed externally to this element, or included in some other network element to achieve this intended functionality. Alternatively, first encapsulator 106a may include software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

Figure 6:
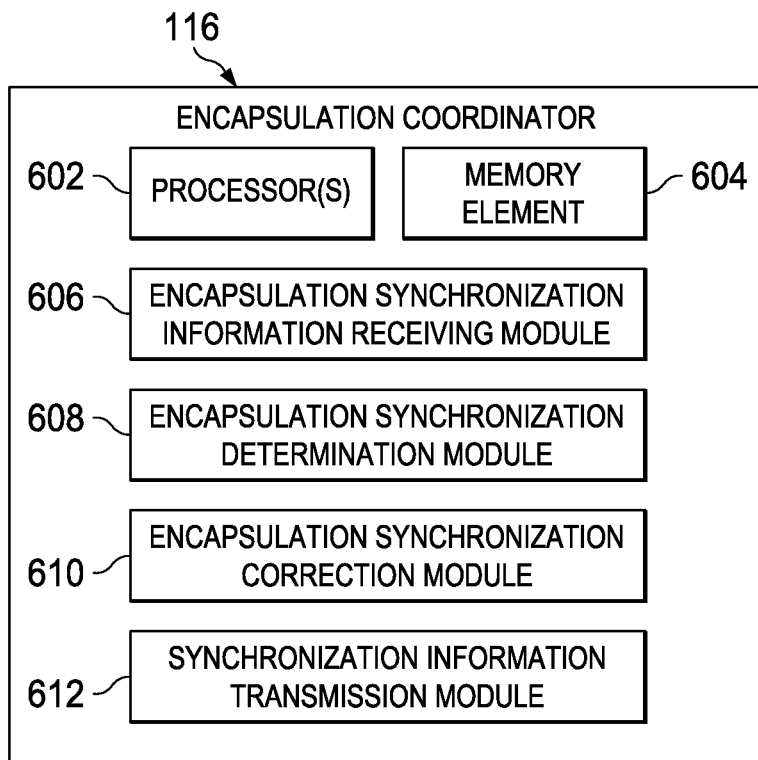
FIG. 6 illustrates a simplified block diagram of an embodiment of the encapsulation coordinator of FIG. 1.

FIG. 6 illustrates a simplified block diagram of an embodiment of encapsulation coordinator 116 of FIG. 1. Encapsulation coordinator 116 includes processor(s) 602, memory element 604, and encapsulation synchronization information receiving module 606, encapsulation synchronization determination module 608, encapsulation synchronization correction module 610, and synchronization information transmission module 612. Processor(s) 602 is configured to execute various tasks of encapsulation coordinator 116 as described herein and memory element 604 is configured to store data associated with encapsulation coordinator 116. Encapsulation synchronization information receiving module 606 is configured to receive synchronization information associated with one or more encapsulating instances from one or more encapsulators such as first encapsulator 106a and second encapsulator 106b. Encapsulation synchronization determination module 608 is configured to determine whether two or more encapsulating instances are in synchronization with one another based upon the received synchronization information associated with each encapsulating instance. Encapsulation synchronization correction module 610 is configured to generate corrected synchronization information to one or more encapsulators if encapsulation synchronization determination module 608 determines that the encapsulating instances are out of synchronization. Synchronization information transmission module 612 is configured to send the corrected synchronization information to one or more encapsulators such as one or more of first encapsulator 106a and second encapsulator 106b.

In one implementation, encapsulation coordinator 116 is a network element that includes software to achieve (or to foster) the encapsulation coordination operations as outlined herein in this Specification. Note that in one example, each of these elements can have an internal structure (e.g., a processor, a memory element, etc.) to facilitate some of the encapsulation coordination operations described herein. In other embodiments, these encapsulation coordination operations may be executed externally to this element, or included in some other network element to achieve this intended functionality. Alternatively, origin encapsulation coordinator 116 may include software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

Figure 7:
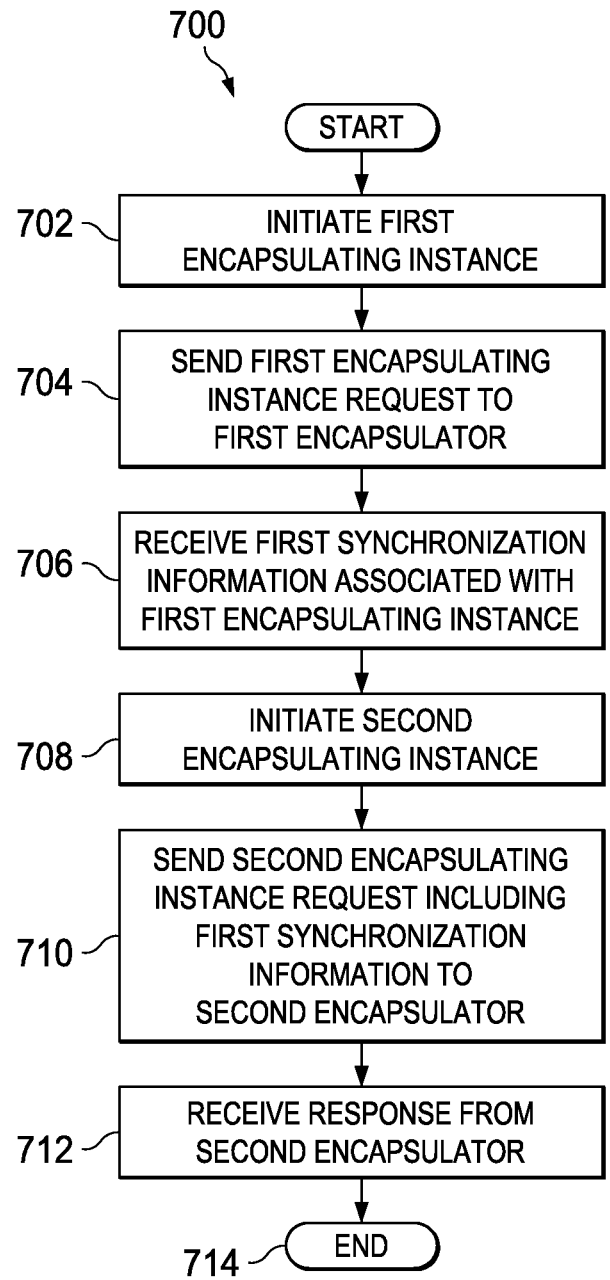
FIG. 7 is a simplified flowchart illustrating one potential operation of the encapsulation coordinator of FIG. 1 for synchronized startup of encapsulating instances.

FIG. 7 is a simplified flowchart 700 illustrating one potential operation of encapsulation coordinator 116 of FIG. 1 for synchronized startup of encapsulating instances. In 702, encapsulation coordinator 116 initiates a first encapsulating instance. In 704, encapsulation coordinator 116 sends a first encapsulating instance request including first encapsulating instance information to first encapsulator 106a. Upon receiving the first encapsulating instance request, first encapsulator 106a will begin encapsulating transcoded media content received from encoder/transcoder 104. In 706, encapsulation coordinator 116 receives first synchronization information associated with the first encapsulating instance from first encapsulator 106a. In one or more embodiments, the first synchronization information may include one or more timestamps and/or indexes associated with segments of the encapsulated output produced by first encapsulator 106a. In still other embodiments, the first synchronization information may further include one or more of a timestamp wrap count value representative of a number of times the timestamp value has wrapped around to an initial timestamp value, a timestamp delta value representative of an amount of time that an incoming timestamp has jumped backward, and a timestamp jump count value representative of a number of times of a discontinuous jump forward in time of a timestamp. In a particular embodiment, the first synchronization information is received from first encapsulator 106a in a response message.

In 708, encapsulation coordinator 116 initiates a second encapsulating instance. In 710, encapsulation coordinator 116 sends a second encapsulating instance request include the first synchronization information to second encapsulator 106b. In 712, encapsulation coordinator 116 receives a response message from second encapsulator 106b regarding the establishment of the second encapsulating instance. In response to receiving the first synchronization information from encapsulation coordinator 116, second encapsulator 106b will begin generating a second encapsulating instance upon the transcoded media content received from encoder/transcoder 104 using the first synchronization information. Accordingly, first encapsulator 106a and second encapsulator 106b will generate equivalent encapsulated outputs. In a particular embodiment, the response may include synchronization information associated with the second encapsulating instance from second encapsulator 106b. The operations then end at 714.

Figure 8:
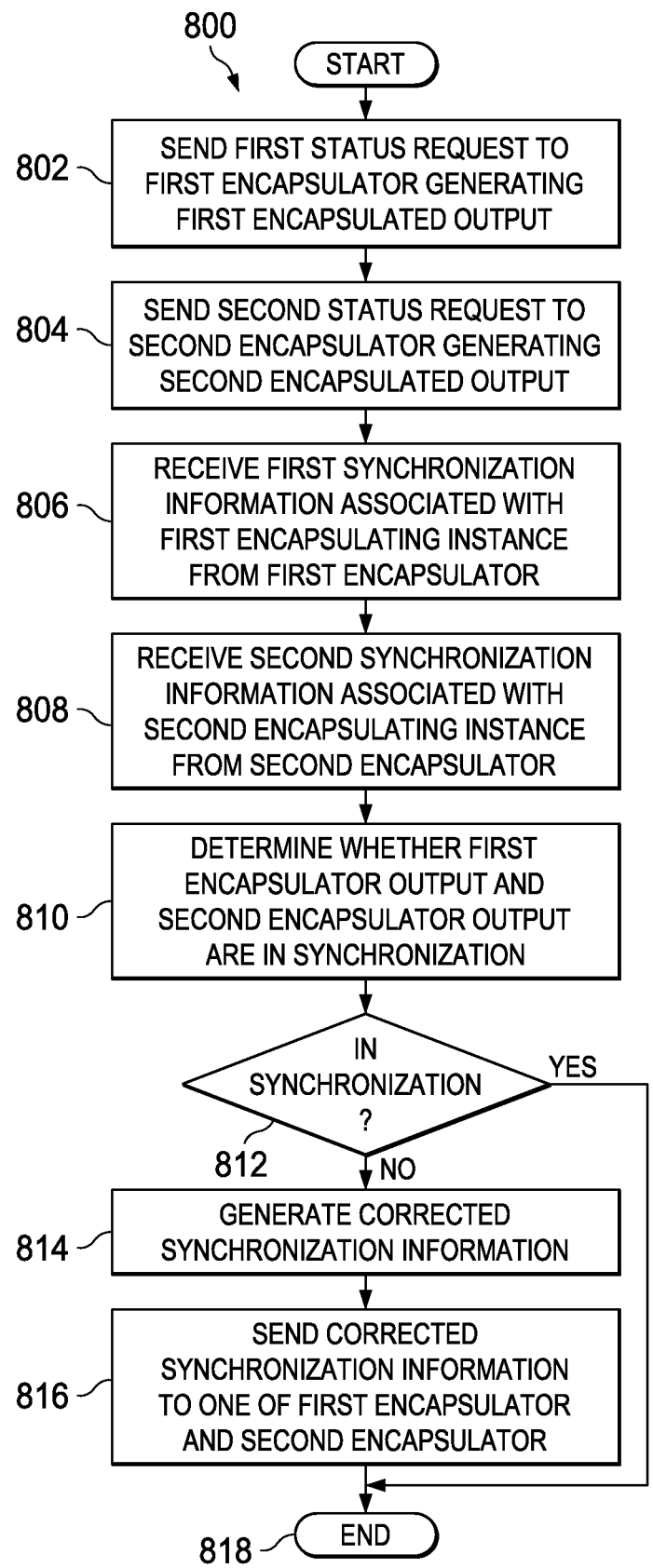
FIG. 8 is a simplified flowchart illustrating one potential operation of the encapsulation coordinator of FIG. 1 for producing equivalent content across encapsulating instances.

FIG. 8 is a simplified flowchart 800 illustrating one potential operation of encapsulation coordinator 116 of FIG. 1 for producing equivalent content across encapsulating instances. In 802, encapsulation coordinator 116 sends a first status request to first encapsulator 106a which is generating a first encapsulated output associated with a first encapsulating instance. In a particular embodiment, the first status request is a Hypertext Transfer Protocol (HTTP) request. In 804, encapsulation coordinator 116 sends a second status request to second encapsulator 106b which is generating a second encapsulated output associated with a second encapsulating instance. In 806, encapsulation coordinator 116 receives first synchronization information associated with the first encapsulated output from first encapsulator 106a. In a particular embodiment, the first synchronization information is received in a "heartbeat" response message generated by first encapsulator 106a. In at least one embodiment, the first synchronization information may include a timestamp associated with the first encapsulated output. In other embodiments, the first synchronization information may further include an index value associated with the first encapsulated output. In still other embodiments, the first synchronization information may further include one or more a timestamp wrap count value representative of a number of times the timestamp value has wrapped around to an initial timestamp value within a timestamp range, a timestamp delta value representative of an amount of time that an incoming timestamp has jumped backward, and a timestamp jump count value representative of a number of times of a discontinuous jump forward in time of the timestamps. In 808, encapsulation coordinator 116 receives second synchronization information associated with the second encapsulated output from second encapsulator 106b. In a particular embodiment, the second synchronization information is received in a "heartbeat" response message generated by second encapsulator 106a. In at least one embodiment, the second synchronization information may include a timestamp associated with the second encapsulated output. In other embodiments, the second synchronization information may further include an index value associated with the second encapsulated output. In still other embodiments, the second synchronization information may further include one or more a timestamp wrap count value representative of a number of times the timestamp value has wrapped around to an initial timestamp value, a timestamp delta value representative of an amount of time that an incoming timestamp has jumped backward, and a timestamp jump count value representative of a number of times of a discontinuous jump forward in time of a timestamp.

In 810, encapsulation coordinator 116 determines whether the first encapsulator output and the second encapsulator output are in synchronization based upon the first synchronization information and the second synchronization information. In at least one embodiment, determining whether the first synchronization information and the second synchronization information are in synchronization includes determining whether the first synchronization information associated with the first encapsulated output is equivalent to the second synchronization information associated with the second encapsulated output. In a particular embodiment, encapsulation coordinator 116 may determine whether a first timestamp included in the first synchronization information is equivalent to a timestamp included in the second synchronization information. In another embodiment, encapsulation coordinator may determine that a timestamp and index included in the first synchronization information is equivalent to a timestamp and index included in the second synchronization information. In still other embodiments, encapsulation coordinator 116 may determine that a timestamp, timestamp wrap count value, a timestamp delta value, and a timestamp jump value included in the first synchronization information is equivalent to that timestamp, timestamp wrap count value, a timestamp delta value, and a timestamp jump value included in the second synchronization information.

In one or more embodiments, encapsulation coordinator 116 may keep a history of a predetermined number of synchronization information messages received from each of first encapsulator 106a and second encapsulator 106b to determine if the first encapsulating instance and the second encapsulating instance are out of synchronization. In some circumstances the first synchronization information and the second synchronization may be offset in time because first encapsulator 106a and second encapsulator 106b may not be receiving the same media content at the exact same time, but it usually is desirable that first encapsulator 106a and second encapsulator 106b receive the media content within a certain window of time with respect to each other. In various embodiments, it is important that the decision points at which the segments or the fragments are being cut from the media content stream by first encapsulator 106a and second encapsulator 106b is the same, not necessarily that first encapsulator 106a and second encapsulator 106b are receiving the media content at the same time. For example, if first encapsulator 106a is three segments ahead and second encapsulator 106b is behind, by the time second encapsulator 106b begins reporting the synchronization points to encapsulation coordinator 116 should still be valid because it is still in the history that first encapsulator 106a was cutting at those same fragments and segments.

In 812, if it is determined that the first encapsulator output is in synchronization with the second encapsulator output, the operations continue to 818 in which the operations end. In 812, if it is determined that the first encapsulator output is not in synchronization with the second encapsulator output, the operations continue to 814. In 814, encapsulation coordinator 116 generates corrected synchronization information. In one or more embodiments, the corrected synchronization information includes synchronization information received from one of first encapsulator 106a and second encapsulator 106b. In a particular embodiment, encapsulation coordinator 116 uses the synchronization information from the encapsulator having the greater timestamp value. In still other embodiments, encapsulation coordinator 116 may generated the corrected synchronization information by extrapolating from previous synchronization information.

In 816, encapsulation coordinator 116 sends the corrected synchronization information to one or more of first encapsulator 106a and second encapsulator 106b. The corrected synchronization information instructs one or more of first encapsulator 106a and second encapsulator 106b to use the corrected synchronization information during their respective encapsulating instances such that the first encapsulated output of first encapsulator 106a and the second encapsulated output of second encapsulator 106b return to synchronization.

In some embodiments, the "heartbeat" message may have several functions in addition to providing synchronization information regarding an encapsulating instance. In some embodiments, the "heartbeat" message may provide encapsulation coordinator 116 with information regarding the status of first encapsulator 106a and second encapsulator 106b as a whole. If encapsulation coordinator 116 does not receive a heartbeat response message from an encapsulator after a predetermined period of time has elapsed, encapsulation coordinator 116 may assume that encapsulator is inoperative and reassign all of its encapsulation channels to another encapsulator. In particular embodiments, the heartbeat message may include a list of encapsulation channels that the encapsulator is currently servicing and may include synchronization information for each encapsulation channel. In a particular instance If encapsulation coordinator 116 thinks that a particular encapsulator is handling a particular channel but the channel does not show up in a heartbeat, the encapsulation coordinator 116 may determine that there is a mismatch. In such cases, encapsulation coordinator 116 may reassign the particular channel to another encapsulator. In still other embodiments, the heartbeat may further include a list of alarms that may be present on a particular encapsulation channel. In a particular embodiment, if encapsulation coordinator 116 knows that one of the channels is having problems, it can determine to assign that channel to a different encapsulator.

In some embodiments, first encapsulator 106a and/or second encapsulator 106b may be configured to correct "would-be" out-of-synchronization output segmentation boundary decisions prior to transmission of the output segments by first encapsulator and/or second encapsulator 106b. In such embodiments, first encapsulator 106a and/or second encapsulator 106b may correct a segmentation boundary decision prior to transmission of the segments by the respective first encapsulator 106a and/or second encapsulator 106b.

Communication network 100 represents a series of points or nodes of interconnected communication paths for receiving and transmitting packets of information that propagate through communication system 100. Communication network 100 offers a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. Communication network 100 may implement a UDP/IP connection and use a TCP/IP communication language protocol in particular embodiments of the present disclosure. However, communication network 100 may alternatively implement any other suitable communication protocol for transmitting and receiving data packets within communication system 100.

Media content source 102, encoder/transcoder 104, first encapsulator 106a, second encapsulator 106b, first origin server 108a, second origin server 108b, and encapsulation coordinator 116 are network elements that facilitate producing equivalent content across encapsulators in a given network (e.g., for networks such as that illustrated in FIG. 1). As used herein in this Specification, the term 'network element' is meant to encompass routers, switches, gateways, bridges, loadbalancers, firewalls, inline service nodes, proxies, servers, processors, modules, or any other suitable device, component, element, proprietary appliance, or object operable to exchange information in a network environment. This network element may include any suitable hardware, software, components, modules, interfaces, or objects that facilitate the operations thereof. This may be inclusive of appropriate algorithms and communication protocols that allow for the effective exchange of data or information.

In one implementation, first encapsulator 106a, second encapsulator 106b, and encapsulation coordinator 116 include software to achieve (or to foster) the encapsulating and coordinating operations, as outlined herein in this Specification. Note that in one example, each of these elements can have an internal structure (e.g., a processor, a memory element, etc.) to facilitate some of the operations described herein. In other embodiments, encapsulating and coordinating operations may be executed externally to these elements, or included in some other network element to achieve this intended functionality. Alternatively, first encapsulator 106a, second encapsulator 106b, and encapsulation coordinator 116 may include this software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

Note that in certain example implementations, the encapsulating and coordinating functions outlined herein may be implemented by logic encoded in one or more non-transitory, tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 5 and FIG. 6) can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor (as shown in FIG. 5 and/or FIG. 6) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

First encapsulator 106a, second encapsulator 106b, and encapsulation coordinator 116 can include memory elements for storing information to be used in achieving the encapsulating and coordinating activities, as discussed herein. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein (e.g., database, tables, trees, cache, etc.) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the steps in the preceding flow diagrams illustrate only some of the possible signaling scenarios and patterns that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

It should also be noted that many of the previous discussions may imply a single client-server relationship. In reality, there is a multitude of servers and clients in certain implementations of the present disclosure. Moreover, the present disclosure can readily be extended to apply to intervening servers further upstream in the architecture. Any such permutations, scaling, and configurations are clearly within the broad scope of the present disclosure.

Although the present disclosure has been described in detail with reference to particular arrangements and configurations, these example configurations and arrangements may be changed significantly without departing from the scope of the present disclosure. Additionally, although communication system 100 has been illustrated with reference to particular elements and operations that facilitate the communication process, these elements and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving first synchronization information associated with a first encapsulated output from a first encapsulator, wherein the first synchronization information includes at least one timestamp value of the first encapsulated output and wherein the first synchronization information further includes one or more a timestamp wrap count value representative of a number of times the timestamp value has wrapped around to an initial timestamp value within a timestamp range, a timestamp delta value representative of an amount of time that a timestamp has lumped backward in time, and a timestamp jump count value representative of a number of times of a discontinuous jump forward in time of a timestamp;
   receiving second synchronization information associated with a second encapsulated output from a second encapsulator;
   determining whether the first encapsulated output and the second encapsulated output are in synchronization within an acceptable threshold based, at least in part, on the first synchronization information and the second synchronization information; and
   responsive to the first encapsulated output and the second encapsulated output being determined to be out of synchronization:
      generating corrected synchronization information by using one of the first synchronization information and the second synchronization information as the corrected synchronization information based upon which of the first synchronization information and the second synchronization information includes a greater timestamp value; and
      sending the corrected synchronization information to one of the first encapsulator and the second encapsulator.

2. The method of claim 1, wherein determining whether the first encapsulated output and the second encapsulated output are in synchronization further includes determining whether the first synchronization information is equivalent to the second synchronization information.

3. The method of claim 1, wherein the first synchronization information further includes a first index value associated with the first encapsulated output.

4. One or more non-transitory tangible media that includes code for execution and when executed by a processor operable to perform operations comprising:
   receiving first synchronization information associated with a first encapsulated output from a first encapsulator, wherein the first synchronization information includes at least one timestamp value of the first encapsulated output and wherein the first synchronization information further includes one or more a timestamp wrap count value representative of a number of times the timestamp value has wrapped around to an initial timestamp value within a timestamp range, a timestamp delta value representative of an amount of time that a timestamp has lumped backward in time, and a timestamp jump count value representative of a number of times of a discontinuous jump forward in time of a timestamp;

receiving second synchronization information associated with a second encapsulated output from a second encapsulator;

determining whether the first encapsulated output and the second encapsulated output are in synchronization within an acceptable threshold based, at least in part, on the first synchronization information and the second synchronization information; and responsive to the first encapsulated output and the second encapsulated output being determined to be out of synchronization:

generating corrected synchronization information by using one of the first synchronization information and the second synchronization information as the corrected synchronization information based upon which of the first synchronization information and the second synchronization information includes a greater timestamp value; and sending the corrected synchronization information to one of the first encapsulator and the second encapsulator.

5. The media of claim 4, wherein determining whether the first encapsulated output and the second encapsulated output are in synchronization further includes determining whether the first synchronization information is equivalent to the second synchronization information.

6. The media of claim 4, wherein the first synchronization information further includes a first index value associated with the first encapsulated output.

7. An apparatus, comprising:
a memory element configured to store data,
a processor operable to execute instructions associated with the data, and
wherein the processor is configured to:

receive first synchronization information associated with a first encapsulated output from a first encapsulator, wherein the first synchronization information includes at least one timestamp value of the first encapsulated output and wherein the first synchronization information further includes one or more a timestamp wrap count value representative of a number of times the timestamp value has wrapped around to an initial timestamp value within a timestamp range, a timestamp delta value representative of an amount of time that a timestamp has lumped backward in time, and a timestamp jump count value representative of a number of times of a discontinuous jump forward in time of a timestamp;

receive second synchronization information associated with a second encapsulated output from a second encapsulator;

determine whether the first encapsulated output and the second encapsulated output are in synchronization within an acceptable threshold based, at least in part, on the first synchronization information and the second synchronization information; and responsive to the first encapsulated output and the second encapsulated output being determined to be out of synchronization:

generate corrected synchronization information by using one of the first synchronization information and the second synchronization information as the corrected synchronization information based upon which of the first synchronization information and the second synchronization information includes a greater timestamp value; and send the corrected synchronization information to one of the first encapsulator and the second encapsulator.

8. The apparatus of claim 7, wherein the processor is further configured to determine whether the first encapsulated output and the second encapsulated output are in synchronization by determining whether the first synchronization information is equivalent to the second synchronization information.

9. The method of claim 1, further comprising periodically polling each of the first encapsulator and the second encapsulator for the first synchronization information and the second synchronization information, respectively.

10. The media of claim 4, wherein the operations further include periodically polling each of the first encapsulator and the second encapsulator for the first synchronization information and the second synchronization information, respectively.

11. The apparatus of claim 7, wherein the processor is further configured to periodically poll each of the first encapsulator and the second encapsulator for the first synchronization information and the second synchronization information, respectively.

* * * * *